United States Patent [19]

Boda et al.

[11] Patent Number: 4,983,135
[45] Date of Patent: Jan. 8, 1991

[54] APPARATUS AND METHOD FOR COOLING EXHAUST IN AN OUTBOARD MARINE PROPULSION SYSTEM

[75] Inventors: James C. Boda, Winneconne; Mark T. Lokken, Oshkosh, both of Wis.

[73] Assignee: Brunswick Corporation, Skokie, Ill.

[21] Appl. No.: 255,617

[22] Filed: Oct. 11, 1988

[51] Int. Cl.⁵ ............................................. B63H 21/38
[52] U.S. Cl. ......................................... 440/88; 440/89
[58] Field of Search ............................ 440/88, 89, 76; 123/41.31; 181/251, 260, 269; 60/310

[56] References Cited

U.S. PATENT DOCUMENTS

| | | |
|---|---|---|
| 2,708,824 | 5/1955 | Engstrom . |
| 3,195,521 | 7/1965 | Larsen ................................. 440/89 |
| 3,310,022 | 3/1967 | Kollman .............................. 440/89 |
| 3,324,533 | 6/1967 | Watteau . |
| 3,541,786 | 11/1970 | Sarra . |
| 4,573,318 | 3/1986 | Entringer et al. . |
| 4,604,069 | 8/1986 | Taguchi .............................. 440/89 |
| 4,607,723 | 8/1986 | Okazaki .............................. 440/89 |

Primary Examiner—Sherman Basinger
Assistant Examiner—Stephen P. Auila
Attorney, Agent, or Firm—Andrus, Sceales, Starke & Sawall

[57] ABSTRACT

An apparatus and method for cooling exhaust in an outboard marine propulsion system provides engine cooling water to the exhaust prior to its discharge into an exhaust cavity formed in the upper portion of a depending gearcase. Excessive heating of the walls surrounding the exhaust cavity is thereby provided. Various embodiments are disclosed for diverting a portion of cooling water from a point adjacent an engine cooling water inlet into the exhaust path prior to discharge into the exhaust cavity.

28 Claims, 3 Drawing Sheets

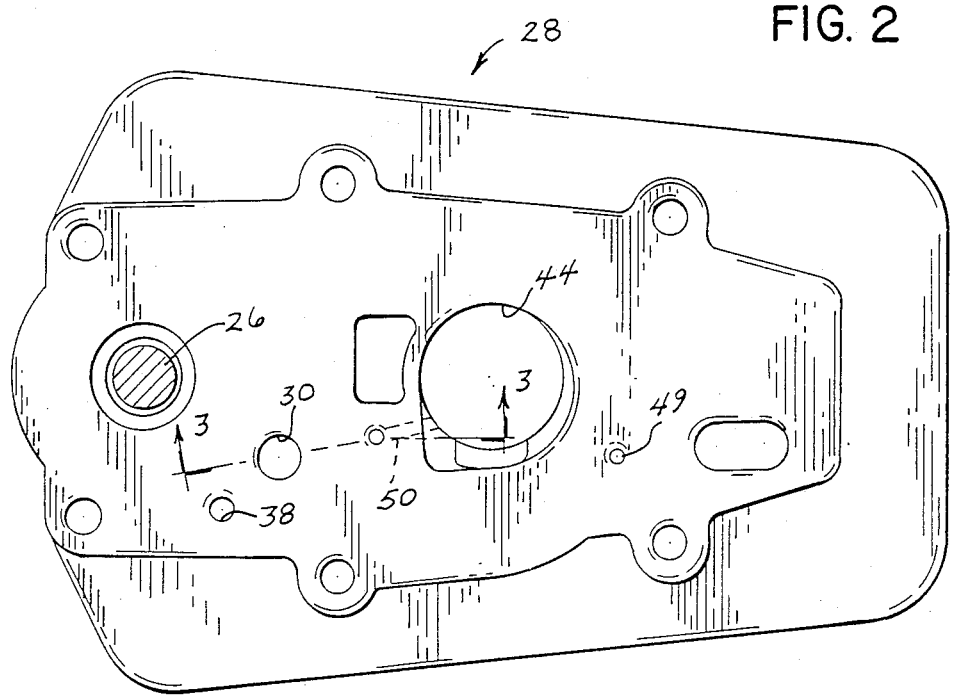
FIG. 2
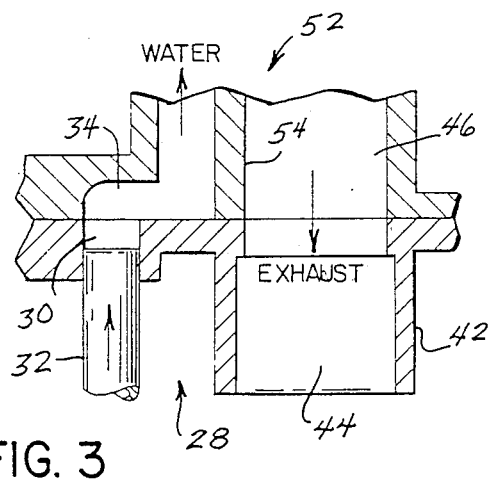
FIG. 3
PRIOR ART
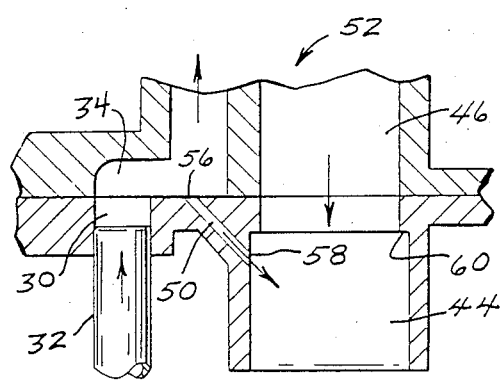
FIG. 4
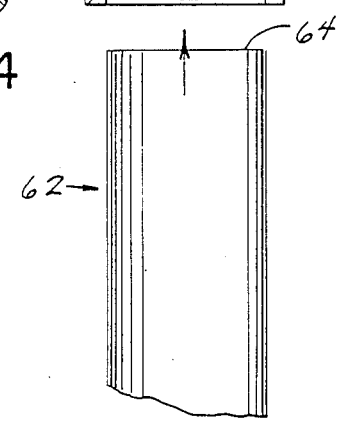

APPARATUS AND METHOD FOR COOLING EXHAUST IN AN OUTBOARD MARINE PROPULSION SYSTEM

BACKGROUND AND SUMMARY

This invention relates to a marine propulsion system, and more particularly to cooling of exhaust in an outboard marine propulsion system.

In an outboard marine propulsion system including a powerhead having a water cooled engine and a depending driveshaft housing and gearcase, water is generally taken in through intake passages formed in the submerged portion of the gearcase and supplied to a water pump, which circulates water to the engine cooling system. In a typical construction, an adaptor plate is positioned between and fastened to both the upper end of the driveshaft housing and the underside of the engine. The adaptor plate includes a passage for allowing cooling water to pass between the driveshaft housing and the engine cooling water inlet. Cooling water then circulates through the engine cooling system, and is routed back to the adaptor plate for discharge through a discharge opening formed therein and into the driveshaft housing.

The upper end of the driveshaft housing has an exhaust cavity formed therein, into which exhaust is discharged from the engine. The lower end of the exhaust cavity is provided with an exhaust outlet, through which exhaust passes for ultimate discharge through the hub of the propeller. According to current design, the upper wall of the exhaust cavity is defined by the adaptor plate. An opening is typically provided in the adaptor plate upstream of the cooling water discharge for diverting a portion of the engine cooling water into the exhaust cavity for cooling exhaust contained therein. However, such water supplied to the exhaust cavity has been circulated through the engine cooling system and heated thereby, thus reducing its ability to cool the exhaust. Further, such water is introduced into the exhaust cavity at the discharge end of the engine cooling system, where the cooling water is under relatively low pressure. Accordingly, a relatively small amount of water is provided to the exhaust cavity.

The adaptor plate typically includes a depending stub having an exhaust passage for passing exhaust from the engine exhaust discharge outlet into the driveshaft housing exhaust cavity. With this design, exhaust is introduced into the exhaust cavity at a point removed from the introduction of cooling water into the exhaust cavity. The exhaust passage formed in the depending stub of the adaptor plate is adapted to receive an exhaust pipe which extends downwardly into the exhaust cavity for providing induction tuning to the engine. With the provision of the exhaust pipe, exhaust is discharged therefrom into the lower portion of the exhaust cavity, which is typically submerged during boat operation. The induction tuning provided by the exhaust pipe increases the engine horsepower by increasing the volume of air taken into the engine cylinders, according to known induction tuning principles.

A problem resulting from the above-described construction is that, when the exhaust pipe is not in place, exhaust is discharged into the exhaust cavity at a point above the water line during boat operation. The high temperature engine exhaust thus excessively heats the upper walls of the driveshaft housing defining the exhaust cavity and located above the water line. The present invention is designed to alleviate this problem.

In accordance with the invention, the outboard marine propulsion system as described is provided with exhaust cooling means for providing cooling water to exhaust flowing through the engine exhaust discharge outlet prior to its entrance into the exhaust cavity. The cooling water is preferably introduced to the exhaust prior to circulation of the cooling water through the cooling system of the engine. The cooling water is thus supplied to the exhaust prior to being heated by the engine, and while under relatively high pressure due to its proximity to the water pump. The cooling water is preferably provided from a point adjacent the engine cooling water inlet.

In one embodiment of the engine, the engine cooling water inlet and the engine exhaust discharge outlet are separated by a wall, and a passage is formed in the wall for diverting a portion of the cooling water from the engine cooling water inlet to the engine exhaust discharge outlet for cooling the exhaust prior to its entrance into the driveshaft housing exhaust cavity.

In another embodiment of the invention, the adaptor plate includes a passage extending between the adaptor plate cooling water passage and the adaptor plate exhaust discharge outlet, for diverting a portion of the cooling water from the engine cooling water inlet to cool the exhaust prior to its discharge into the exhaust cavity. Two adaptor plate structures are disclosed for carrying out this embodiment of the invention. In a first structure, the adaptor plate is provided with an upwardly facing trough formed in its upper surface. The trough has an inlet in communication with the engine cooling water inlet, and an outlet in communication with the adaptor plate exhaust passage. In a second structure, the passage inlet is in communication with the engine cooling water inlet, and the passage outlet is disposed at a point downstream of the inlet to the adaptor plate exhaust passage. According to the latter structure, positioning of the induction tuning exhaust pipe into the adaptor plate exhaust passage plugs the cooling water passage outlet for blocking the flow of cooling water therethrough.

The invention further contemplates an adaptor plate constructed as detailed above. Also disclosed is a method of cooling exhaust in an outboard system, substantially according to the foregoing summary.

BRIEF DESCRIPTION OF THE DRAWINGS

The drawings illustrate the best mode presently contemplated of carrying out the invention.

In the drawings:

FIG. 2 is a top plan view of an adaptor plate for positioning between the powerhead and depending driveshaft housing and gearcase of the outboard system, reference being made to line 2—2 of FIG. 1;

FIG. 3 is a sectional view taken generally along line 3—3 of FIG. 2, showing a prior art construction for the engine cooling water inlet and engine exhaust discharge outlet;

FIG. 4 is a partial sectional view similar to FIG. 3, showing one embodiment of the exhaust cooling system of the invention;

DETAILED DESCRIPTION OF THE PREFERRED EMBODIMENT

Figure 1:
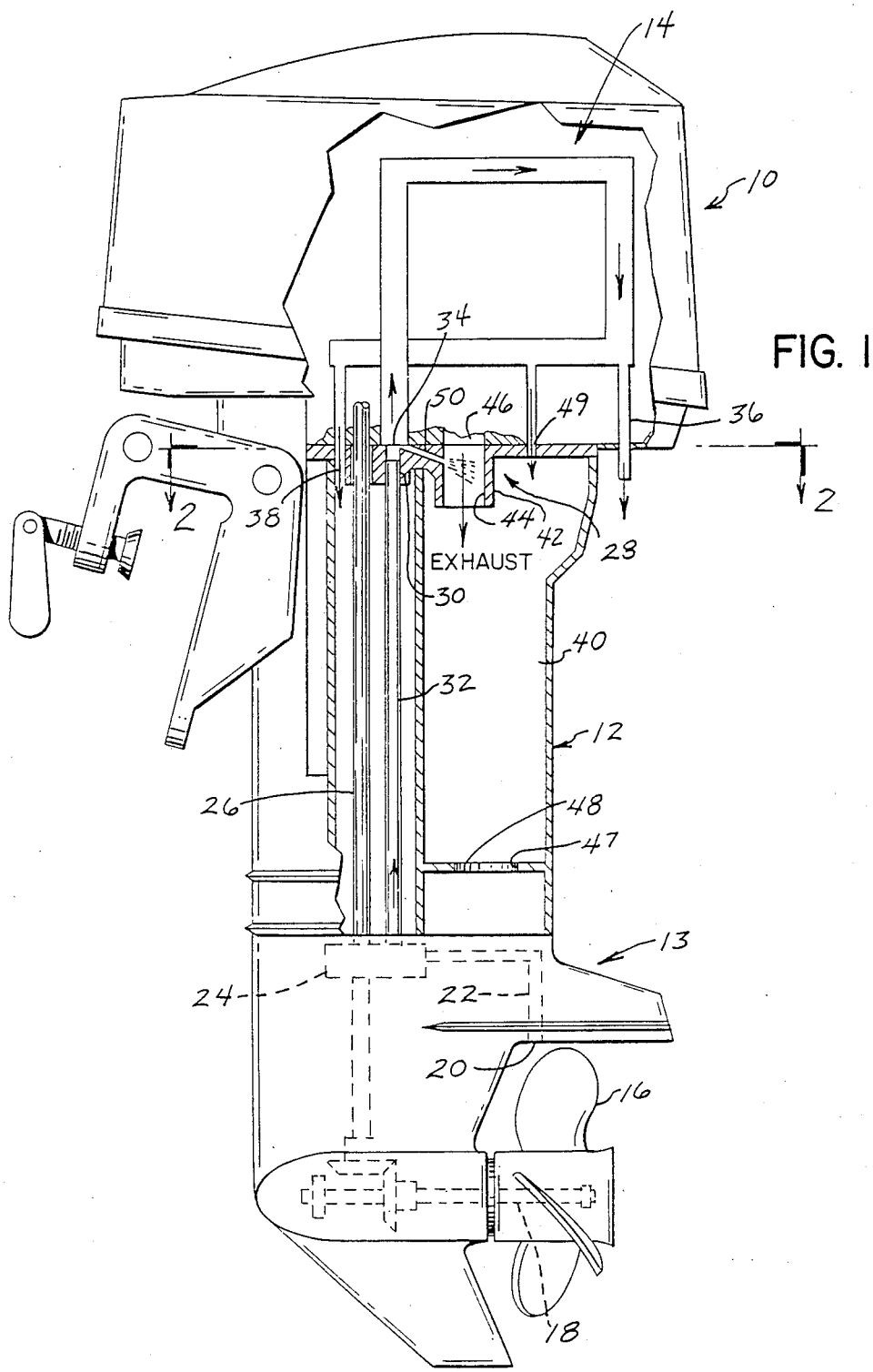
FIG. 1 is a side elevation view, with portions broken away and in section, showing an outboard marine propulsion system incorporating an exhaust cooling structure according to the invention.

With reference to FIG. 1, an outboard marine propulsion system includes a powerhead 10 and a depending driveshaft housing 12 to which a gearcase 13 is connected. As is known, powerhead 10 includes a water cooled internal combustion engine (not shown), the water cooling system of which is shown generally at 14.

As is known, a propeller 16 is mounted to a propeller shaft 18 rotatably mounted at the lower end of gearcase 13. One or more water intake passages, shown at 20, are provided in the lower portion of gearcase 13 adjacent the upper end of the path defined by rotation of propeller 16. This provides intake cooling water to a cooling water passage 22 leading to a water pump 24. As is known, water pump 24 includes an impeller adapted to rotate in response to rotation of a vertically extending driveshaft 26 connected to the engine, for pumping water through the engine cooling system whenever the engine is running.

An adaptor plate, shown generally at 28, is connected to the upper end of driveshaft housing 12 and to the underside of the water cooled engine provided in powerhead 10. Adaptor plate 28 includes a passage 30 adapted to receive the upper end of a cooling water tube 32, which has its lower end connected to water pump 24. With this construction, water pump 24 provides cooling water to adaptor plate water passage 30.

An engine cooling water inlet, shown at 34, is positioned above adaptor plate water passage 30 for introducing cooling water into engine cooling system 14. Cooling water passes through engine water inlet 34 and into cooling system 14 for cooling the engine during operation. A tell tale water dump 36 is provided for indicating that water is satisfactorily circulating through engine cooling system 14. After circulation through engine cooling system 14, the heated cooling water passes through a cooling water discharge opening 38 formed in adaptor plate 28 and downwardly into driveshaft housing 12 for discharge.

Driveshaft housing 12 includes an exhaust cavity 40 formed at its upper end by the driveshaft housing walls, the upper wall of which is defined by the lower surface of adaptor plate 28. Adaptor plate 28 includes a depending stub 42 having an exhaust passage 44 extending therethrough. With this construction, exhaust discharged from the engine through an engine exhaust discharge outlet, shown at 46, passes through adaptor plate exhaust passage 44 for discharge into exhaust cavity 40. Exhaust is discharged from exhaust cavity 40 through an outlet 47 formed in lower wall 48 of exhaust cavity 40, for ultimate discharge through the hub of propeller 16, as is known. Alternatively, exhaust may be discharged through any other satisfactory means.

Adaptor plate 28 has an opening 49 for allowing engine cooling water to pass into the upper portion of exhaust cavity 40. While opening 49 provides a certain amount of cooling water to exhaust cavity 40, it has been found that cooling water so provided is unsatisfactory to sufficiently cool exhaust introduced into cavity 40. Water introduced through opening 49 has been substantially heated during circulation through engine cooling system 14, and is under relatively low pressure. Accordingly, the result has been that the walls of cavity 40 positioned above the water line during boat operation become excessively heated.

To cool exhaust prior to its entrance into exhaust cavity 40, a cooling water passage 50 is formed in adaptor plate 28. Cooling water passage 50 extends between a point adjacent engine cooling water inlet 34 and adaptor plate exhaust passage 44. With this construction, exhaust passing from the engine through engine exhaust outlet 46 and through adaptor plate exhaust passage 44 is cooled prior to its introduction into the upper portion of exhaust cavity 40. Excessive heating of the upper portion of the walls of exhaust cavity 40 is thus prevented.

FIG. 2 illustrates the top plan view of adaptor plate 28. The various openings and passages formed in adaptor plate 28 are shown in FIG. 2.

FIG. 3 illustrates the prior art construction of a portion of adaptor plate 28 and of the lower portion of an engine block adapted for placement thereon, shown generally at 52. As shown, a wall 54 is positioned between engine cooling water inlet 34 and engine exhaust discharge passage 46. Wall 54 extends to the lower extremity of engine block 52 so that, when engine block 52 is connected to adaptor plate 28, its lower end abuts the upper surface of adaptor plate 28.

FIG. 4 illustrates cooling water passage 50 extending between an inlet 56 in communication with engine cooling water inlet 34 and an outlet 58 in communication with adaptor plate exhaust passage 44. With this construction, cooling water passes from engine cooling water inlet 34 directly to adaptor plate exhaust passage 44 prior to circulation of cooling water through the engine cooling system, and while the cooling water is under relatively high pressure from pump 24. Injection of cooling water into exhaust passage 44 cools exhaust prior to its entrance into exhaust cavity 40.

As shown in FIG. 4, adaptor plate exhaust passage 44 has a circumferential internal shoulder 60 formed therein. When it is desired to increase the power output of the engine, an induction tuning exhaust pipe 62 is positioned within adaptor plate exhaust passage 44 so that its upper end 64 abuts internal shoulder 60. With the provision of exhaust pipe 62, the entrance of exhaust into exhaust cavity 40 is extended downwardly into cavity 40 to a point below the water line during boat operation. The walls of cavity 40 are thus cooled by the external water to prevent excessive heating thereof. According to known induction tuning principles, when exhaust pipe 62 is in place the amount of intake air supplied to the engine is increased, providing increased power output. With exhaust pipe 62 positioned within adaptor plate exhaust passage 44, cooling water outlet 58 of cooling water passage 50 is plugged so that flow of cooling water therethrough is prevented. This construction is advantageous in that a common adaptor plate can be used whether or not exhaust pipe 62 is employed.

Figure 5:
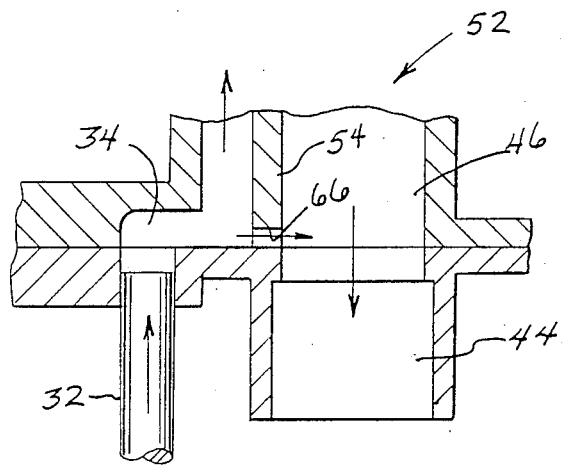
FIG. 5 is a view similar to FIGS. 3 and 4, showing another embodiment of the exhaust cooling system of the invention.

An alternate construction for carrying out the invention is shown in FIG. 5. In this arrangement, a passage 66 is formed at the lowermost point of wall 54 provided between engine cooling water inlet 34 and engine exhaust passage 46. With this construction, cooling water is satisfactorily provided to flow of exhaust through engine exhaust discharge passage 46 prior to its entrance into exhaust cavity 40. No changes are required in the construction of adaptor plate 28.

Figure 6:
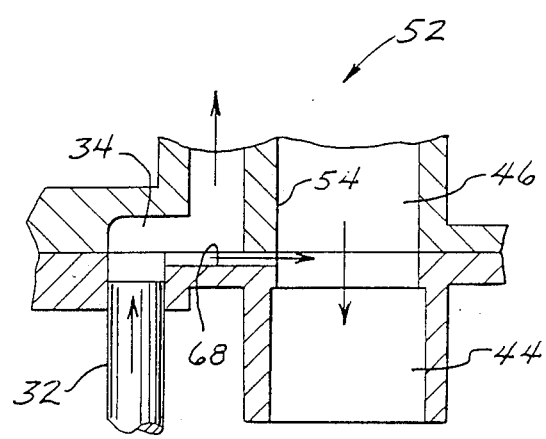
FIG. 6 is a view similar to FIGS. 3, 4 and 5, showing yet another embodiment of the exhaust cooling system of the invention.

FIG. 6 illustrates yet another embodiment for providing cooling water to exhaust prior to its entrance into exhaust cavity 40. In this arrangement, an upwardly facing trough 68 is formed in the upper surface of adaptor plate 28. Trough 68 has an inlet in communication with engine cooling water inlet 34, and an outlet in communication with adaptor plate exhaust passage 44. Again, this construction provides adequate supply of cooling water to exhaust prior to its entrance into exhaust cavity 40, and requires only a relatively minor modification to adaptor plate 28.

Adaptor plate 28 may be constructed with or without opening 49, and in either instance results in satisfactory exhaust cooling. Elimination of opening 49 simply results in increased water pressure within cooling system 14 and increased flow of cooling water into the exhaust path.

The invention further contemplates a method of cooling exhaust prior to its discharge into an exhaust cavity, substantially in accordance with the above-described construction.

Various alternatives and embodiments are contemplated as being within the scope of the following claims particularly pointing out and distinctly claiming the subject matter regarded as the invention.

We claim:

1. An outboard marine propulsion system, comprising:
   a powerhead including a water cooled engine having a cooling water inlet and an exhaust discharge outlet;
   a depending driveshaft housing connected at its upper end to said powerhead, said depending driveshaft housing having an exhaust cavity which extends substantially to the powerhead and is in direct communication with said engine exhaust discharge outlet for receiving exhaust therefrom; and
   exhaust cooling means for providing cooling water to exhaust flowing through said engine exhaust discharge outlet prior to entrance of the exhaust into said exhaust cavity.

2. The outboard marine propulsion system of claim 1, wherein said exhaust cooling means provides cooling water to the exhaust prior to circulation of said cooling water through the cooling system of said engine.

3. The outboard marine propulsion system of claim 2, wherein said exhaust cooling means provides cooling water to the exhaust from a point adjacent said engine cooling water inlet.

4. The outboard marine propulsion system of claim 3, wherein said engine cooling water inlet and said engine exhaust discharge outlet are separated by a wall, and wherein said exhaust cooling means comprises a passage formed in said wall for diverting a portion of said cooling water from said engine cooling water inlet to said engine exhaust discharge outlet for cooling the exhaust.

5. The outboard marine propulsion system of claim 3, further comprising an adaptor plate for placement adjacent the upper end of said depending driveshaft housing for supporting said engine, said adaptor plate including a cooling water passage for providing cooling water to said engine cooling water inlet, and an exhaust passage for discharging exhaust from said engine exhaust discharge outlet and into said exhaust cavity.

6. The outboard marine propulsion system of claim 5, wherein said exhaust cooling means comprises a passage extending between said adaptor plate cooling water passage and said exhaust discharge outlet for diverting a portion of said cooling water to said engine exhaust discharge outlet for cooling the exhaust prior to its discharge into said exhaust cavity.

7. The outboard marine propulsion system of claim 6, wherein said passage comprises an upwardly open trough formed in the upper surface said adaptor plate, said trough being open to said engine cooling water inlet for receiving cooling water therefrom, and said trough having an end in communication with said engine exhaust discharge outlet for supplying cooling water to exhaust passing therethrough.

8. The outboard marine propulsion system of claim 5, wherein said cooling means comprises a passage extending between said engine cooling water inlet and said adaptor plate exhaust passage for diverting a portion of said cooling water thereto for cooling the exhaust prior to its discharge into said exhaust cavity.

9. The outboard marine propulsion system of claim 8, wherein said adaptor plate exhaust passage is adapted to receive an exhaust pipe for providing induction tuning to said engine by extending the point of discharge of said exhaust into said exhaust cavity beyond the point of discharge of exhaust into said exhaust cavity by said adaptor plate exhaust passage, and wherein said exhaust pipe includes a first end adapted to mate with said adaptor plate exhaust passage.

10. The outboard marine propulsion system of claim 9, wherein said adaptor plate exhaust passage includes an internal shoulder against which said first end of said exhaust pipe is positioned.

11. The outboard marine propulsion system of claim 10, wherein said passage for diverting a portion of cooling water to said adaptor plate exhaust discharge passage has its outlet positioned downstream of said internal shoulder provided in said adaptor plate exhaust discharge passage, so that said passage is plugged when said exhaust pipe is positioned with its first end adjacent said shoulder to cut off the flow of water through said passage.

12. The outboard marine propulsion system of claim 11, wherein said passage has its inlet formed in the upper surface of said adaptor plate, and wherein said passage extends downwardly at an angle relative to said adaptor plate upper surface to its outlet in said adaptor plate exhaust discharge passage.

13. In a marine propulsion including a powerhead having a water cooled engine with a cooling water inlet and an exhaust discharge outlet, and a depending driveshaft housing connected at its upper end to said powerhead and having an exhaust cavity extending substantially to the powerhead and being in direct communication with said engine exhaust discharge outlet for receiving exhaust therefrom, the improvement comprising exhaust cooling means for providing cooling water to exhaust flowing through said exhaust discharge outlet prior to entrance of the exhaust into said exhaust cavity.

14. The improvement according to claim 13, wherein said exhaust cooling means provides cooling water to the exhaust prior to circulation of said cooling water through the cooling system of said engine.

15. The improvement according to claim 14, wherein said exhaust cooling means provides cooling water to the exhaust from a point adjacent said engine cooling water inlet.

16. For a marine propulsion system including a powerhead having a water cooled engine with a cooling water inlet and an exhaust discharge outlet, and a depending driveshaft housing including an exhaust cavity, an adaptor plate for placement between said water cooled engine and said depending driveshaft housing, said adaptor plate comprising:

an exhaust passage for discharging exhaust from said engine exhaust discharge outlet into said exhaust cavity;

a cooling water passage for providing cooling water to said engine cooling water inlet; and exhaust cooling means comprising passage means for diverting cooling water from a point adjacent said engine cooling water inlet to said exhaust passage for cooling exhaust passing therethrough prior to its entry into said exhaust cavity.

17. The adaptor plate according to claim 16, wherein said adaptor plate passage means includes an inlet and an outlet and comprises an upwardly facing trough formed in the upper surface of said adaptor plate, and wherein a portion of the length of said trough is in communication with said engine cooling water inlet for forming said passage means inlet, and wherein the outlet of said passage means is in communication with said adaptor plate exhaust discharge passage for providing cooling water thereto.

18. The adaptor plate according to claim 16, wherein said adaptor plate passage means includes an inlet formed in the upper surface of said adaptor plate and in communication with said engine cooling water inlet, and an outlet in communication with said adaptor plate exhaust passage and disposed below the upper surface of said adaptor plate.

19. The adaptor plate according to claim 18, wherein said passage means extends downwardly from said inlet to said outlet at an angle relative to the upper surface of said adaptor plate.

20. The adaptor plate according to claim 19, wherein said adaptor plate exhaust passage includes an internal shoulder against which an end of an exhaust pipe is positioned for providing induction tuning to said engine, and wherein said passage means outlet is positioned downstream of said internal shoulder so that, when said exhaust pipe is positioned within said adaptor plate exhaust passage with an end abutting said internal shoulder formed therein, said passage means is plugged for blocking flow of cooling water therethrough.

21. A method of cooling exhaust in an outboard marine propulsion system, comprising the steps of:

providing a powerhead including a water cooled engine having a cooling water inlet and an exhaust discharge outlet;

providing a depending driveshaft housing including an exhaust cavity;

connecting said driveshaft housing at its upper end to said powerhead such that the exhaust cavity of said driveshaft housing extends substantially to the powerhead and is in direct communication with the exhaust discharge outlet of said powerhead; and introducing cooling water to exhaust discharged through said engine exhaust discharge outlet at a point upstream of the discharge of exhaust into said exhaust cavity for cooling the exhaust prior to its entry into said exhaust cavity.

22. The method of claim 21, wherein said step of introducing cooling water to exhaust discharged through said engine exhaust discharge outlet comprises introducing cooling water thereto from a point prior to circulation of said cooling water through the cooling system of said engine.

23. The method of claim 22, wherein said step of introducing cooling water to exhaust discharged through said engine exhaust discharge outlet comprises introducing cooling water thereto from a point adjacent said engine cooling water inlet.

24. The method of claim 23, wherein said engine cooling water inlet and said engine exhaust discharge outlet are separated by a wall, and wherein said step of introducing cooling water to exhaust discharged through said engine exhaust discharge outlet comprises forming an opening in said wall between said engine cooling water inlet and said engine exhaust discharge outlet for diverting cooling water from said engine cooling water inlet into exhaust prior to passage of the exhaust into said exhaust cavity.

25. The method of claim 23, further comprising the step of providing an adaptor plate positioned between said engine and the upper end of said driveshaft housing, said adaptor plate including a cooling water passage for providing cooling water to said engine cooling water inlet and an exhaust passage for passing exhaust from said engine to said exhaust cavity, and wherein the step of introducing cooling water to exhaust discharged through said engine exhaust discharge outlet comprises forming a passage in said adaptor plate so as to provide an inlet in communication with said engine cooling water inlet and an outlet in communication with said adaptor plate exhaust passage.

26. The method of claim 25, wherein said step of forming a passage in said adaptor plate comprises forming an upwardly facing trough in the upper surface of said adaptor plate.

27. The method of claim 25, wherein said step of forming a passage in said adaptor plate comprises forming a downwardly extending passage in said adaptor plate relative to the upper surface of said adaptor plate such that said passage outlet is positioned below the upper surface of said adaptor plate.

28. The method of claim 27, further comprising the step of forming an internal shoulder in said adaptor plate exhaust passage for receiving an end of an exhaust pipe adapted to mate with said passage for providing induction tuning to said engine, and wherein said step of forming a passage in said adaptor plate is carried out such that said passage outlet is positioned downstream of said internal shoulder so that, when said exhaust pipe is positioned within said adaptor plate exhaust passage with an end thereof placed against said internal shoulder, said passage outlet is plugged so as to block the flow of cooling water therethrough.

* * * * *